May 6, 1930.  A. CHAMPION  1,757,411
SPEEDOMETER CASE
Filed Sept. 2, 1927
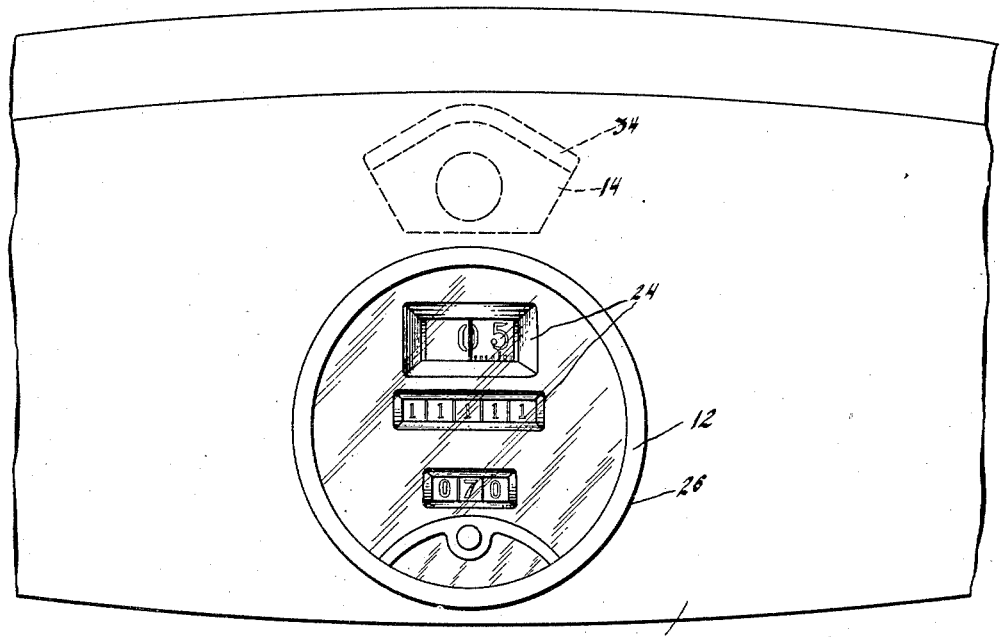
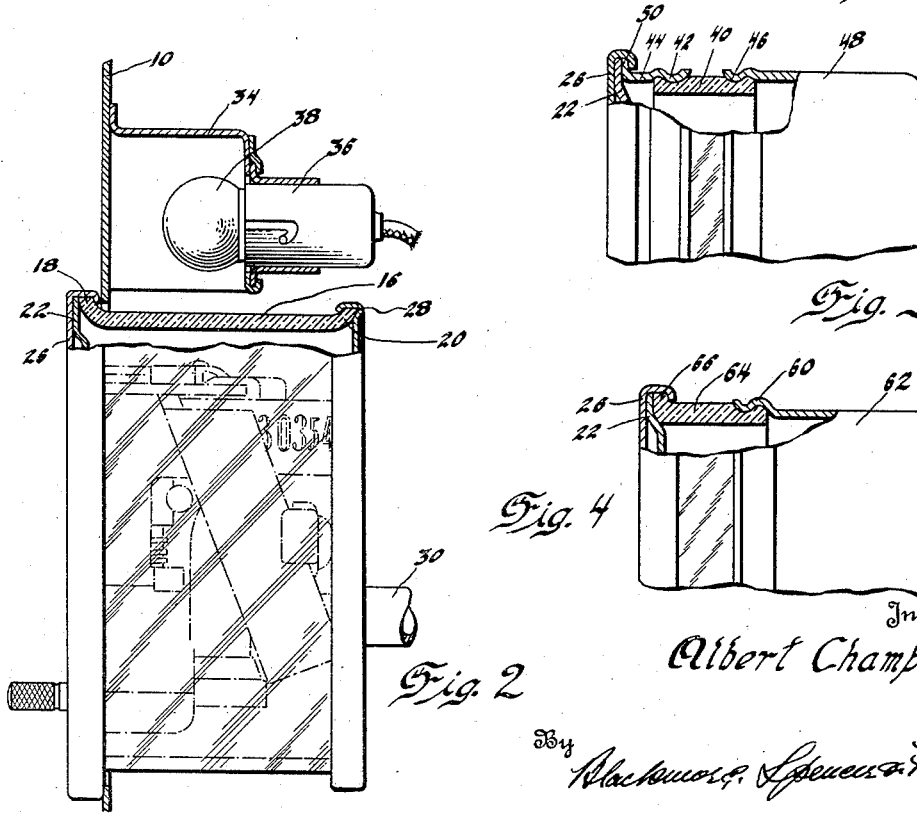
Inventor
Albert Champion Patented May 6, 1930

1,757,411

UNITED STATES PATENT OFFICE

ALBERT CHAMPION, OF FLINT, MICHIGAN, ASSIGNOR TO A C SPARK PLUG COMPANY, OF FLINT, MICHIGAN, A COMPANY OF MICHIGAN

SPEEDOMETER CASE

Application filed September 2, 1927. Serial No. 217,288.

This invention relates to a case for an instrument of type ordinarily mounted in groups adjacent a source of light and more particularly to the type of instrument usually mounted on the dashboard of an automotive vehicle.

It is an object of this invention to provide a case for such an instrument which will permit the entrance of light from a source positioned adjacent thereto for illuminating the dials and other mechanism within the instrument. It is a further object of this invention to provide a case which is simple in construction and economical to manufacture and which will permit adequate illumination of the mechanism and particularly the dials when mounted on an instrument board provided with a source of light adjacent the instrument and on the side of the board opposite the operator.

Other objects of the invention will appear in the course of the following description, taken in connection with the accompanying drawing and appended claims.

In the drawings:

Figure 1 is a front view.

Figure 2 is a side view with parts broken away.

Figures 3 and 4 are side views with parts broken away, showing modified forms of my invention.

Referring to the drawing, the numeral 10 indicates the dashboard of an automotive vehicle, and mounted in an aperture therein is the speedometer head 12. Just above the speedometer head and fixed to the rear side of the dashboard is the light fixture, indicated generally at 14.

Referring to Figure 2, I have illustrated the speedometer case as comprising a glass cylinder 16 provided with front and rear flanged rims 18 and 20. Fitting against the front flanged rim is the face plate 22 which is provided with the desired apertures 24 for exposing the various dials of the speedometer head. Metal bezel 26 is crimped about the flanged rim 18 and holds the face plate 22 in place against the rim of the cylinder. Metal back plate 28 is crimped over the rear flanges 20 and is provided with the necessary apertures for the drive shaft 30 or other mechanism. The speedometer head may be held within the aperture in the dashboard by any usual or desired means (not shown.)

Fixed to the dashboard above the speedometer head is the reflector plate 34 in which is supported the socket 36 for the light bulb 38. The reflector, which is ordinarily finished on its inner side to provide a good reflecting surface, is shaped to reflect the light to the various instruments on the dashboard, its shape depending on the arrangement of the instruments. As the cylinder 16 is transparent it is apparent that all the mechanism within the cylinder, including the dials thereof, when the instrument is a speedometer, will be well illuminated.

In the modification illustrated in Figure 3, the speedometer head casing comprises a glass cylinder 40 provided with front and rear beads within which are crimped the rear edge 42 of the annular metallic member 44 and the front edge 46 of the rear metallic cup-shaped member 48. The member 44 is formed with a flange 50. The face plate 22 is held against the flange in the usual manner by the bezel 26.

In the modification shown in Figure 4 the rim 60 of the metallic cup-shaped case 62 is crimped into the bead on the glass cylinder 64. This cylinder is provided with a flange 66 about its rim, and the usual bezel 26 is crimped over this flange for holding the face plate 22 over the case.

In any of the three modifications illustrated there is ample surface for the light to penetrate into the instrument for illumination of the dials or other mechanism. While I have illustrated my invention as applied to a speedometer case it is obvious that it may be used with other instruments it may be desirable to mount on the dashboard of an automotive vehicle.

I claim:

1. In an instrument adapted to be mounted in an aperture in an instrument board, a case comprising a body portion of transparent material provided with front and rear flanges, the front flange extending farther out than the rear, a metallic cover crimped about the rear flange, and an apertured front cover held in position by an annular member crimped about the front flange.

2. In combination, an instrument board including a source of light, an indicating instrument mounted in said board, said instrument including a transparent casing provided with front and rear flanges, front and rear covers secured to said flanges, said front flange being of a larger dimeter than the rear flange and abutting against said instrument board.

In testimony whereof I affix my signature.

ALBERT CHAMPION.